(12) United States Patent
Read

(10) Patent No.: US 8,019,810 B2
(45) Date of Patent: Sep. 13, 2011

(54) TELEVISION VIEWING OF RSS

(75) Inventor: Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 761 days.

(21) Appl. No.: 11/636,015

(22) Filed: Dec. 8, 2006

(65) Prior Publication Data

US 2007/0214477 A1   Sep. 13, 2007

Related U.S. Application Data

(60) Provisional application No. 60/780,275, filed on Mar. 7, 2006.

(51) Int. Cl.
*G06F 15/16* (2006.01)

(52) U.S. Cl. ......................... 709/203; 709/206; 709/207

(58) Field of Classification Search .................. 709/203
See application file for complete search history.

(56) References Cited

U.S. PATENT DOCUMENTS

| 2003/0167467 | A1 |  | 9/2003 | Allen et al. |
| 2003/0226152 | A1 | * | 12/2003 | Billmaier et al. ............ 725/135 |
| 2005/0039136 | A1 |  | 2/2005 | Othmer |
| 2005/0165615 | A1 | * | 7/2005 | Minar ............................. 705/1 |
| 2006/0235885 | A1 | * | 10/2006 | Steele et al. ............... 707/104.1 |

FOREIGN PATENT DOCUMENTS

| WO | WO 03/026275 A2 | 3/2003 |
| WO | WO 2004/012065 A2 | 2/2004 |

* cited by examiner

*Primary Examiner* — John Follansbee
*Assistant Examiner* — Maceeh Anwari
(74) *Attorney, Agent, or Firm* — Miller Patent Services; Jerry A. Miller

(57) ABSTRACT

A method of displaying items from an RSS feed on a television display involves registering the RSS feed with an RSS aggregator, the RSS feed aggregator being operatively coupled to the television display for display of RSS feed items; at the RSS aggregator, polling the RSS feed for RSS feed items; determining if the RSS feed contains an item that has been newly added since a preceding poll of the RSS feed; and if the RSS feed contains an item that has been newly added since a preceding poll of the RSS feed, downloading and displaying the newly added item on the television display replacing a previously displayed item from the RSS feed. This abstract is not to be considered limiting, since other embodiments may deviate from the features described in this abstract.

7 Claims, 3 Drawing Sheets

TELEVISION VIEWING OF RSS

CROSS REFERENCE TO RELATED DOCUMENTS

This application claims priority benefit of U.S. Provisional Application No. 60/780,275 filed Mar. 7, 2006 which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Traditional user interface techniques used in television set displays are designed for channel selection and other conventional television functions. The television set display itself is designed to display entertainment content.

As the television set becomes a focal point for home entertainment and home networks, it is desirable to optimize the ability to display various types of information on the display in an unobtrusive manner. Text information has been displayed in various manners on television displays including horizontally or vertically scrolling ticker style information displayed (generally on the lower several lines of the display).

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
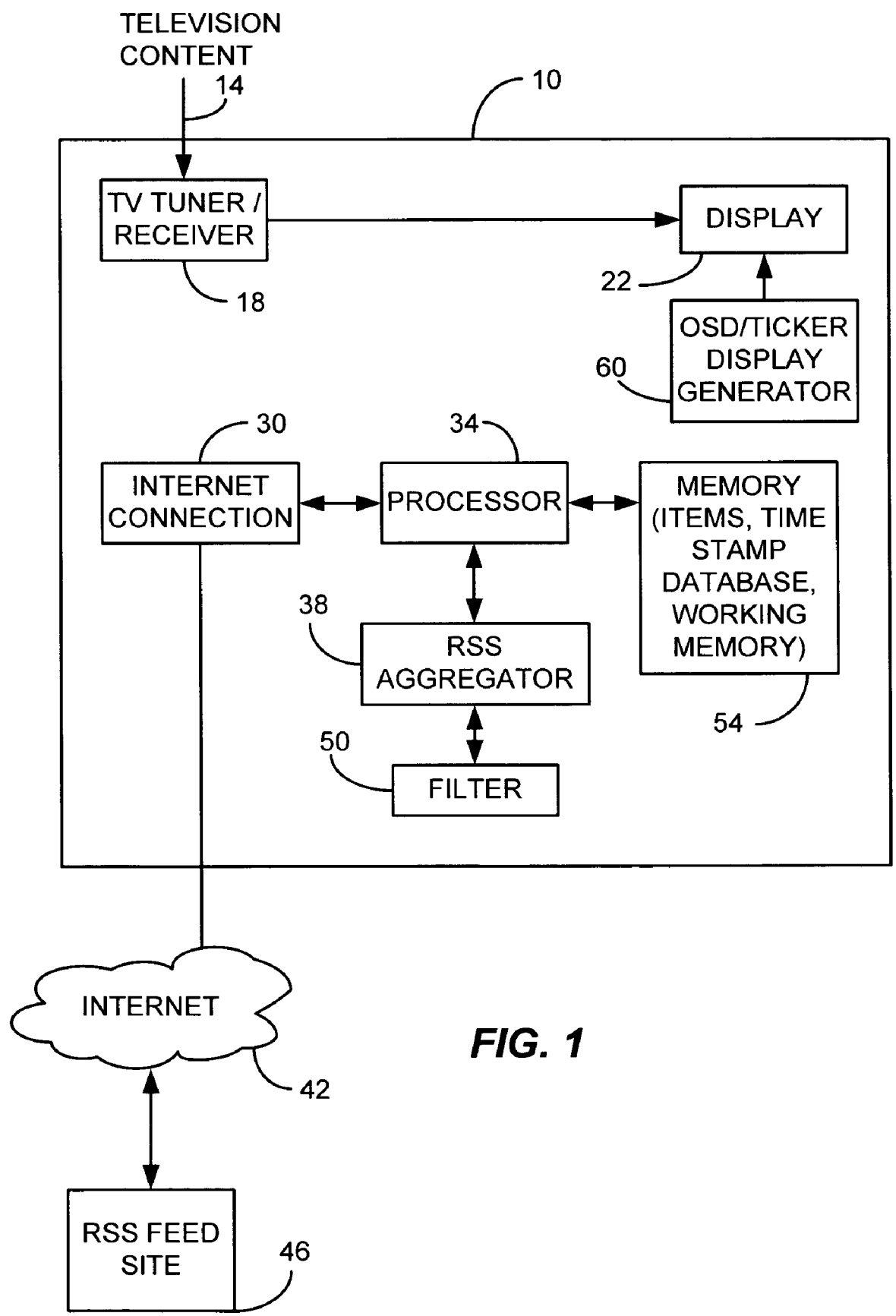
FIG. 1 is a block diagram depicting a television with RSS feed display capability consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

The term "RSS" is used in reference to blog-like Internet published content and has been variously indicated to be an abbreviation for "Rich Site Summary" or "Really Simple Syndication". An RSS feed provides a collection of information that is periodically updated with new content, with each element of content being commonly referred to as an "item". Such RSS feeds can be used to carry news items, special interest items and other information such as stock quotes and the like. RSS feeds resemble web pages except that formatting is generally minimal.

When RSS feed items are viewed using a computer with browser software, the user can readily navigate to a suitable URL in order to access the feed and can readily scroll to an item of interest. RSS feeds are conveniently read on a personal computer (PC). On the PC, navigation of the Internet is well understood and is an active process. People can select the feeds they want to read, and read the items from the feeds that they are interested in. However, the conventional paradigms used for television program navigation and related functions are not readily adapted to use in viewing RSS feeds using a television display. On a TV navigation is more tricky because television is a more passive medium than interaction with a computer. There is traditionally no mouse, no keyboard, and a conventional remote control device gives only limited control. Moreover, television navigation is more conventionally a matter of tuning and passively consuming entertainment content.

If items from an RSS feed are to be viewed in an unobtrusive manner using a television display device, care should be taken to avoid the user becoming bored or overwhelmed with information. Due to the limited portion of the display that can be employed without becoming distracting or disruptive of viewing of television programming, the display should provide the information in a sequential manner (i.e., horizontal or vertical scrolling in a ticker-like manner). However, such a sequential display of an item can become tiresome and result in delays in seeing information that is most desirable. Without unnecessarily complicating the user interface or remote control features, display of an RSS feed item can produce an unsatisfying user experience.

In accordance with certain embodiments consistent with the present invention, stock-ticker style viewing (either vertically or horizontally scrolling) of RSS feeds on a TV can be provided in an efficient manner by displaying only newly updated items, rather than entire feeds. This minimizes the amount of repetitive information that the user is required to view by only displaying the newest items from a particular feed (noting that multiple feeds may be subscribed to). TV watchers are familiar with a stock-ticker type source of news or other information that is crawling across the bottom of the screen. This is a natural mode for displaying RSS data, since it is just a different source of data to crawl along the bottom of the screen. However, the problem of assuring that the user finds the data of interest without being overwhelmed or bored is not adequately addressed by use of this technique alone.

In accordance with certain embodiments, the display of items is limited to the items that are new and thus presumably haven't been seen before. This has the advantage in the TV environment of not distracting the viewer with items that have been viewed before. The mechanism to detect the newness of an item within a feed depends upon the particular feed, but generally a time stamp is applied to each item of a feed. By parsing the content of the feed, the latest item or items can be identified by examining each item's time stamp (generally identifying a date and time of posting). For each RSS feed, this time stamp can be compared with a stored time stamp stored the last time the RSS feed was accessed so that older items can be ignored.

Some RSS reading programs will highlight those items that are new (unread) by a particular user, allowing the user easier identification new items of interest. Such program techniques can also be used in accord with various embodiments.

Embodiments consistent with the present invention can be implemented using a programmed process forming a portion of a television set enabled for RSS feed reception and display. Turning now to FIG. 1, an RSS feed enabled television set 10 is depicted in which TV content may be received at 14 (e.g., via broadcast, cable, satellite or Internet TV). In a conventional receiver, the TV content signal is received (directly or through a set top or set back box) at a television tuner/receiver 18. In this simplified block diagram, the tuned television program is passed to the display 22 (audio circuitry and Television receiver details have been omitted for clarity).

Via a separate or common connection (e.g., as with a digital or analog cable television connection), the television set 10 incorporates an Internet connection (e.g., such as a cable or other modem) 30 connected to a processor 34 such as a microcomputer. Processor 34 can operate to run an RSS aggregator computer program 38. RSS aggregator, which may operate as a browser program plug-in or any other suitable embodiment, utilizes Internet connection to connect through the Internet 42 to one or more RSS site 46 that serves as a source as RSS formatted content in the form of items as described above.

When an RSS feed item is retrieved by the RSS aggregator 38, most recent items from the RSS feed are filtered by the filter 50, so that the most recent item or items are stored to memory 54 along with a database of time stamp or other information used to differentiate between older items and newer items. In this manner, whenever an RSS item is determined to be newly added, the filter identifies it as a new item. In certain embodiments, only a single item (the newest) is ever stored and displayed, but in other embodiments, for example, the user can elect to have the most recent 2, 3, or other number of items displayed. This decision can be displayed based upon many factors including the size of the typical item from a particular RSS feed and frequency of typical update.

Once an item from a particular RSS feed is stored in memory 54, it can be retrieved by processor 34 and directed to an on-screen display circuit 60 that carries out a computer graphics process that displays the RSS feed information in the form of a ticker that scrolls horizontally or vertically in much the same way that stock market, sports and news information is depicted on certain television networks.

Figure 2:
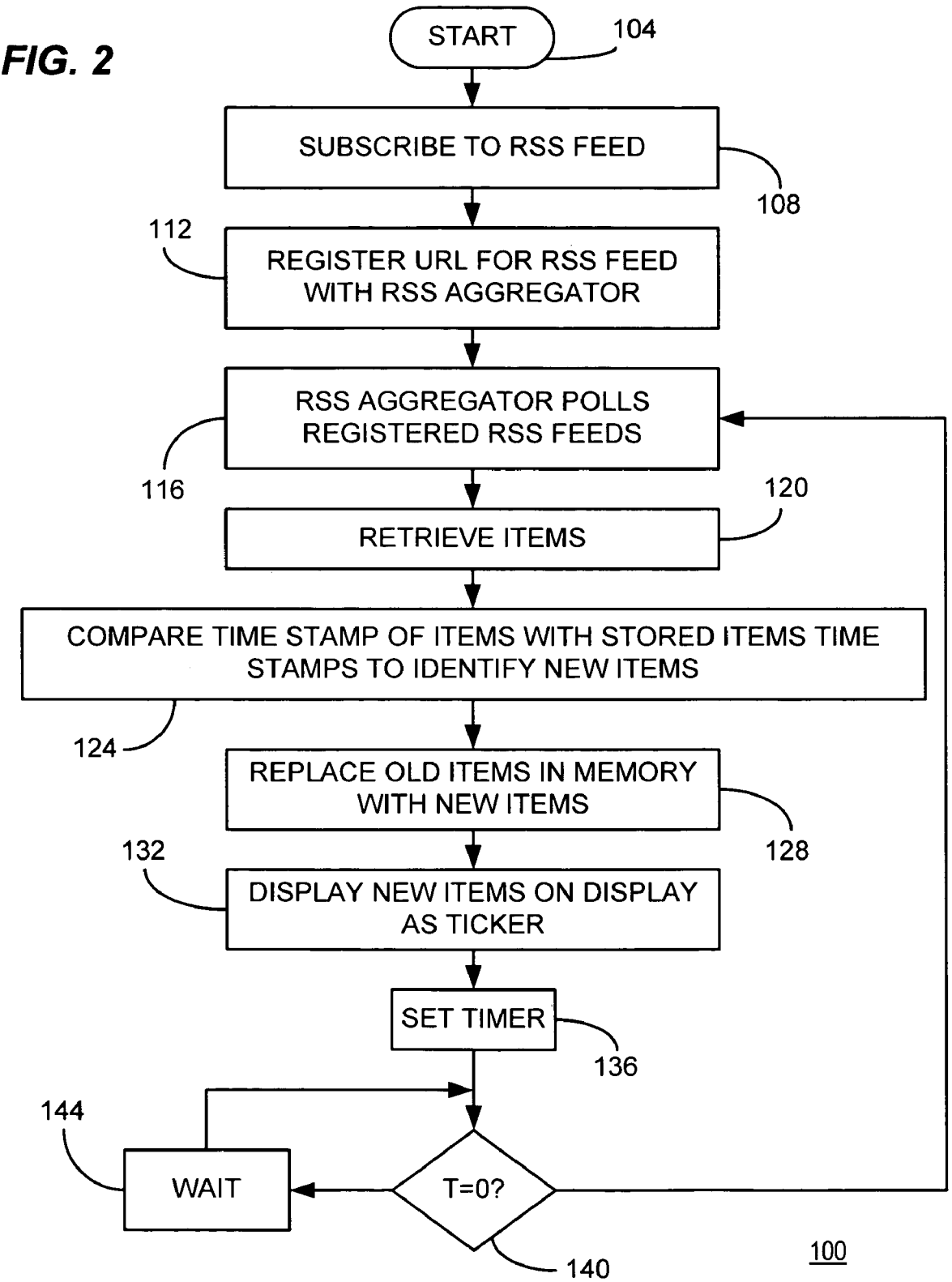
FIG. 2 is a flow chart depicting an exemplary process for display of RSS feed items on a television in a manner consistent with certain embodiments of the present invention.

One exemplary process 100 consistent with certain embodiments is depicted in FIG. 2 starting at 104. In this exemplary process, a user subscribes or otherwise associates with an RSS feed source as required by the source in order to receive the items of content at 108. Such feeds may or may not require a monetary fee for the description. The universal resource locator (URL) associated with the RSS feed is then registered at 112 with the RSS aggregator 38 via any suitable user interface (e.g., a keyboard simulation using a remote controller device). In certain embodiments, the URLs can be directly entered via the User Interface (UI) or may be selected using various default mechanisms such as by selection of sites by location of the receiver or manufacturer. Such mechanisms can be registered as a starting point by entry of a zip code, area code, country code, manufacturer programming Thus in this method, the registering can be carried out by identification of an RSS feed on the basis of a location identifier for a location where the location identifier might be one or more of a zip code, a postal code, country code, an area code, a location name or code or a GPS coordinate (potentially from an integrated GPS receiver). Additional RSS feeds can be added, or existing feeds can be eliminated at any time by use of the UI, and other techniques for identifying RSS feeds such as key word searches or selection from menus of RSS feed sites provided via an Internet connection are also contemplated without limitation.

Once the RSS feeds are registered, RSS aggregator 38 polls the registered URL for each RSS feed site 46 via the Internet connection 30 at 116. The items are then retrieved from each RSS feed at 120 and the time stamps of the items are compared with the time stamps of stored items at 124 in order to determine which item or items have been newly added since the stored items were stored. When new items are identified, they are used to replace older items in memory 54 at 128. Equivalently, new items can be added to the memory and the most recent items (those identified for display) flagged for display so that older items can be accessed quickly without need to retrieve them from the Internet.

The newest item or items (as elected by the user or established at manufacture) displayed at 132 using the on screen display generator 60, displaying the items as a scrolling ticker. This process can be repeated at periodic intervals in a number of ways. As depicted, after 132 by setting a count down timer at 136. In this embodiment, when the timer reaches zero at 140, control returns to 116. Until the timer reaches zero, wait functions of suitable time is implemented at 144.

Figure 3:
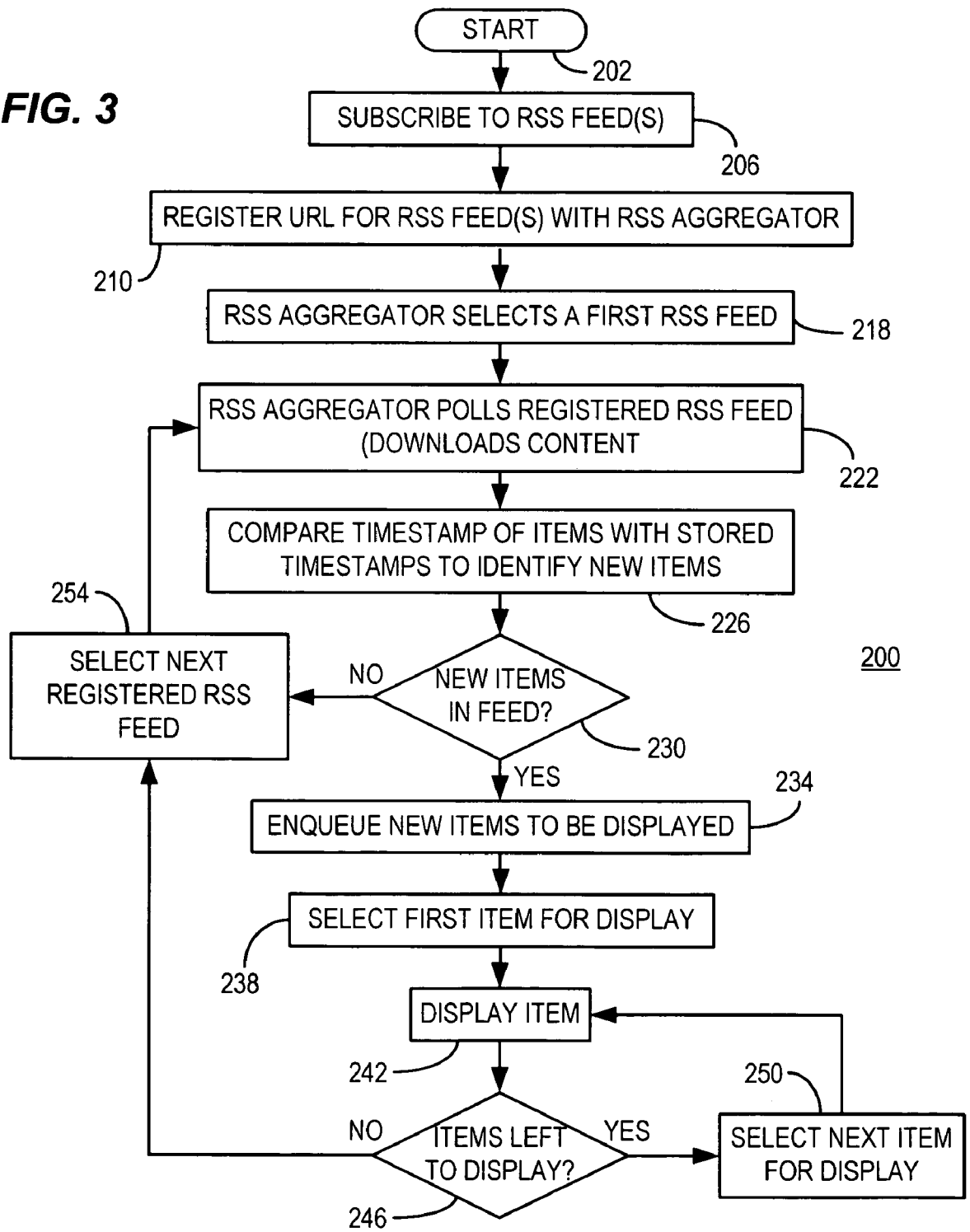
FIG. 3 is a flow chart depicting another exemplary process for display of RSS feed items on a television in a manner consistent with certain embodiments of the present invention.

FIG. 3 depicts a preferred embodiment consistent with the present invention as process 200 starting at 202 after which the user subscribes to one or more RSS feeds at 206 using any suitable mechanism. The subscribed RSS feeds are then registered at 210 with the RSS aggregator. The RSS aggregator selects a first of the feeds at 218.

The RSS aggregator polls the selected feed at 222 and compares with timestamp of the feed with stored timestamps to identify any new items at 226. If there is a new item or items in the feed at 230, the new items are placed in queue at 234 for display. The next item in queue is selected at 238 and displayed at 242. If there are more items to be displayed at 246, the next item is selected at 250 and displayed at 242. If no items are left to display at 246, the next registered RSS feed is selected at 254 and control passes to 222. Also, if a particular feed has no new items at 230, control passes to 254 where the next feed is selected. While not shown explicitly, it will be understood that when the last registered RSS feeds is reached, the process repeats starting with the first RSS feed so as to continually or periodically search for new items for display.

It should be noted that the present embodiment is depicted as being implemented within a television set, the circuitry depicted could be implemented in numerous variations including within various other television receiver devices such as VCR or DVR devices or set top boxes without departing from embodiments consistent with the present invention.

In accordance with certain embodiments, it is also desirable to provide the viewer with navigation capability so that older items can be read, if desired. This can be implemented using remote control navigation functions to carry out Internet navigation via the Internet connection, but will be less necessary when the above teachings are utilized so that the new items from the RSS feeds are efficiently displayed on the television display.

Thus, in accordance with certain embodiments, a method of displaying items from an RSS feed on a television display involves registering the RSS feed with an RSS aggregator, the RSS feed aggregator being operatively coupled to the television display for display of RSS feed items; at the RSS aggregator, polling the RSS feed for RSS feed items (which normally involves downloading the entire feed—basically a single file containing all the items and time stamps); determining if the RSS feed contains an item that has been newly added since a preceding poll of the RSS feed; and if the RSS feed contains an item that has been newly added since a preceding poll of the RSS feed, displaying the newly added item on the television display. While an item might in some embodiments be displayed repeatedly until it is replaced, in the preferred embodiment the new item is simply queued for display, without actually replacing anything.

In certain embodiments, the item is displayed in a scrolling ticker format. In certain embodiments, the newly added item is the only item from the RSS feed displayed on the television display at any one time. In certain embodiments, the polling is carried out at periodic time intervals. In certain embodiments, determining if the RSS feed contains an item that has been newly added since a preceding poll of the RSS feed comprises comparing an item's time stamp with a stored time stamp associated with an item being displayed. In certain embodiments, the registering is carried out by commands from a remote commander that identify a universal resource locator associated with the RSS feed. In certain embodiments, the registering is carried out by identification of an RSS feed on the basis of a location identifier for a location where the method is carried out. In certain embodiments, the location identifier comprises one of a zip code, a postal code, a country code, an area code, a location name or code and a GPS coordinate. In certain embodiments, the registering is carried out by identification of an RSS feed on the basis of a manufacturer programmed universal resource locator. A computer readable electronic storage medium stores instructions which, when executed on a programmed processor, carry out any of the above methods.

In another embodiment, a method of displaying items from an RSS feed on a television display involves registering the RSS feed with an RSS aggregator, the RSS feed aggregator being operatively coupled to the television display for display of RSS feed items; at the RSS aggregator, periodically polling the RSS feed for RSS feed items; determining if the RSS feed contains an item that has been newly added since a preceding poll of the RSS feed, wherein determining if the RSS feed contains an item that has been newly added since a preceding poll of the RSS feed comprises comparing an item's time stamp with a stored time stamp associated with an item being displayed; and if the RSS feed contains an item that has been newly added since a preceding poll of the RSS feed, downloading and displaying the newly added item on the television display in a scrolling ticker format, the newly added item replacing a previously displayed item from the RSS feed.

A television device, consistent with certain embodiments has a television display. An Internet connection carries out communication with the Internet. An RSS aggregator is coupled to the Internet connection that polls universal resource locators for various RSS feeds. A memory stores items from the RSS feed. A filter identifies newly added items in the RSS feed and replacing items in the memory with the newly added items. A display generator displays the newly added item to the television display.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of displaying items from an RSS feed on a home entertainment television display, comprising:

at a television receiver and tuner, receiving and tuning a television program;

at the home entertainment television display, displaying the television program;

registering the RSS feed with an RSS aggregator, the RSS aggregator being operatively coupled to the home entertainment television display for display of RSS feed items;

at the RSS aggregator, polling the RSS feed for RSS feed items, where the registering is carried out by identification of an RSS feed on the basis of a location identifier for a location where the method is carried out, and where the location identifier comprises a GPS coordinate;

determining if the RSS feed contains an item that has been newly added since a preceding poll of the RSS feed, where determining if the RSS feed contains an item that has been newly added since a preceding poll of the RSS feed comprises comparing an item's time stamp with a stored time stamp, where the determining if the RSS feed contains an item that has been newly added since a preceding poll of the RSS feed comprises comparing an item's time stamp with a stored time stamp associated with an item being displayed, where the newly added item is the only item from the RSS feed displayed on the home entertainment television display at any one time;

if the RSS feed contains an item that has been newly added since a preceding poll of the RSS feed, displaying the newly added item on the home entertainment television display, where the item is displayed in a scrolling ticker format; and where the registering is carried out by commands from a remote commander that identify a universal resource locator associated with the RSS feed, and where the registering is carried out by identification of an RSS feed on the basis of a manufacturer programmed universal resource locator.

2. The method according to claim 1, wherein the polling is carried out at periodic time intervals.

3. The method according to claim 1, wherein determining if the RSS feed contains an item that has been newly added since a preceding poll of the RSS feed comprises comparing an item's time stamp with a stored time stamp associated with the RSS feed being polled.

4. A tangible non-transitory computer readable storage medium storing instructions which, when executed on a programmed processor, carry out a process according to claim 1.

5. A method of displaying items from an RSS feed on a home entertainment television device, comprising:

at a television receiver and tuner, receiving and tuning a television program;

at a home entertainment television display, displaying the television program;

registering the RSS feed with an RSS aggregator, the RSS aggregator being operatively coupled to the television display for display of RSS feed items, the registering is carried out by identification of an RSS feed on the basis of a location identifier for a location where the method is carried out and where the location identifier comprises a GPS coordinate;

at the RSS aggregator, periodically polling the RSS feed for RSS feed items;

determining if the RSS feed contains an item that has been newly added since a preceding poll of the RSS feed, wherein determining if the RSS feed contains an item that has been newly added since a preceding poll of the RSS feed comprises comparing an item's time stamp with a stored time stamp associated with an item being displayed, the newly added item is the only item from the RSS feed displayed on the home entertainment television display at any one time;

if the RSS feed contains an item that has been newly added since a preceding poll of the RSS feed, displaying the newly added item on the home entertainment television display in a scrolling ticker format; and where the registering is carried out by commands from a remote commander that identify a universal resource locator associated with the RSS feed, and where the registering is carried out by identification of an RSS feed on the basis of a manufacturer programmed universal resource locator.

6. A home entertainment television device, comprising:

a home entertainment television display;

a television receiver and tuner circuit that receives and tunes a television that is displayed on the home entertainment television device display;

an Internet connection that carries out communication with the Internet;

an RSS aggregator coupled to the Internet connection that polls universal resource locators for RSS feeds;

a memory that stores items from an RSS feed that is registered with the RSS aggregator on a basis of a location identifier, and where the location identifier comprises a GPS coordinate;

a filter that identifies newly added items in the RSS feed;

an on-screen display generator that displays the newly added item to the home entertainment television display, where the item is displayed in a scrolling ticker format, and the newly added item is the only item from the RSS feed displayed on the home entertainment television display at any one time;

where the filter determines if the RSS feed contains an item that has been newly added since a preceding poll of the RSS feed by comparing an item's time stamp with a stored time stamp associated with an item being displayed or an RSS feed being polled; and where the registering is carried out by commands from a remote commander that identify a universal resource locator associated with the RSS feed, and where the registering is carried out by identification of an RSS feed on the basis of a manufacturer programmed universal resource locator.

7. The device according to claim 6, wherein the RSS aggregator polls the internet for the RSS feed at periodic time intervals.

* * * * *